US012719571B2

(12) United States Patent
Satou

(10) Patent No.: US 12,719,571 B2
(45) Date of Patent: Aug. 25, 2026

(54) OPTICAL COMMUNICATION DEVICE AND CONTROL METHOD FOR OPTICAL COMMUNICATION DEVICE

(71) Applicant: NEC Corporation, Tokyo (JP)

(72) Inventor: Yoshirou Satou, Tokyo (JP)

(73) Assignee: NEC CORPORATION, Tokyo (JP)

( * ) Notice: Subject to any disclaimer, the term of this patent is extended or adjusted under 35 U.S.C. 154(b) by 246 days.

(21) Appl. No.: 18/294,800

(22) PCT Filed: Aug. 20, 2021

(86) PCT No.: PCT/JP2021/030520

§ 371 (c)(1),
(2) Date: Feb. 2, 2024

(87) PCT Pub. No.: WO2023/021679

PCT Pub. Date: Feb. 23, 2023

(65) Prior Publication Data

US 2024/0348331 A1 Oct. 17, 2024

(51) Int. Cl.
*H04B 10/079* (2013.01)

(52) U.S. Cl.
CPC .................................. *H04B 10/079* (2013.01)

(58) Field of Classification Search
CPC .................................................. H04J 14/0272
See application file for complete search history.

(56) References Cited

U.S. PATENT DOCUMENTS

2002/0114065 A1* 8/2002 Neuhauser ............ H01S 3/1022 359/341.3
2002/0131101 A1* 9/2002 Ohira .................. H04J 14/0241 398/58
2011/0008051 A1* 1/2011 Miyaji ................ H04J 14/0275 398/79
2020/0266897 A1* 8/2020 Ruggeri ................. H04B 10/25

FOREIGN PATENT DOCUMENTS

JP H08-298533 A 11/1996
JP H09-116517 A 5/1997
JP 2007-259316 A 10/2007
JP 2007-320855 A 12/2007

OTHER PUBLICATIONS

International Search Report for PCT Application No. PCT/JP2021/030520, mailed on Nov. 2, 2021.
English translation of Written opinion for PCT Application No. PCT/JP2021/030520, mailed on Nov. 2, 2021.

* cited by examiner

*Primary Examiner* — Shi K Li

(57) ABSTRACT

In this optical communication device, the multiple optical signal processing units are provided on one optical path; and on the basis of a mask setting that is set by a specific optical signal processing unit, which is among the multiple optical signal processing units and includes the detection unit that has detected the failure, for a next-stage optical signal processing unit connected to the optical path after the specific optical signal processing unit, the reception unit does not output, to the outside, a failure notification from the detection unit provided in the optical signal processing unit for which the mask setting is set and outputs, to the outside, a failure notification from the detection unit provided in any of the optical signal processing units for which the mask setting is not set.

7 Claims, 6 Drawing Sheets

Fig.2

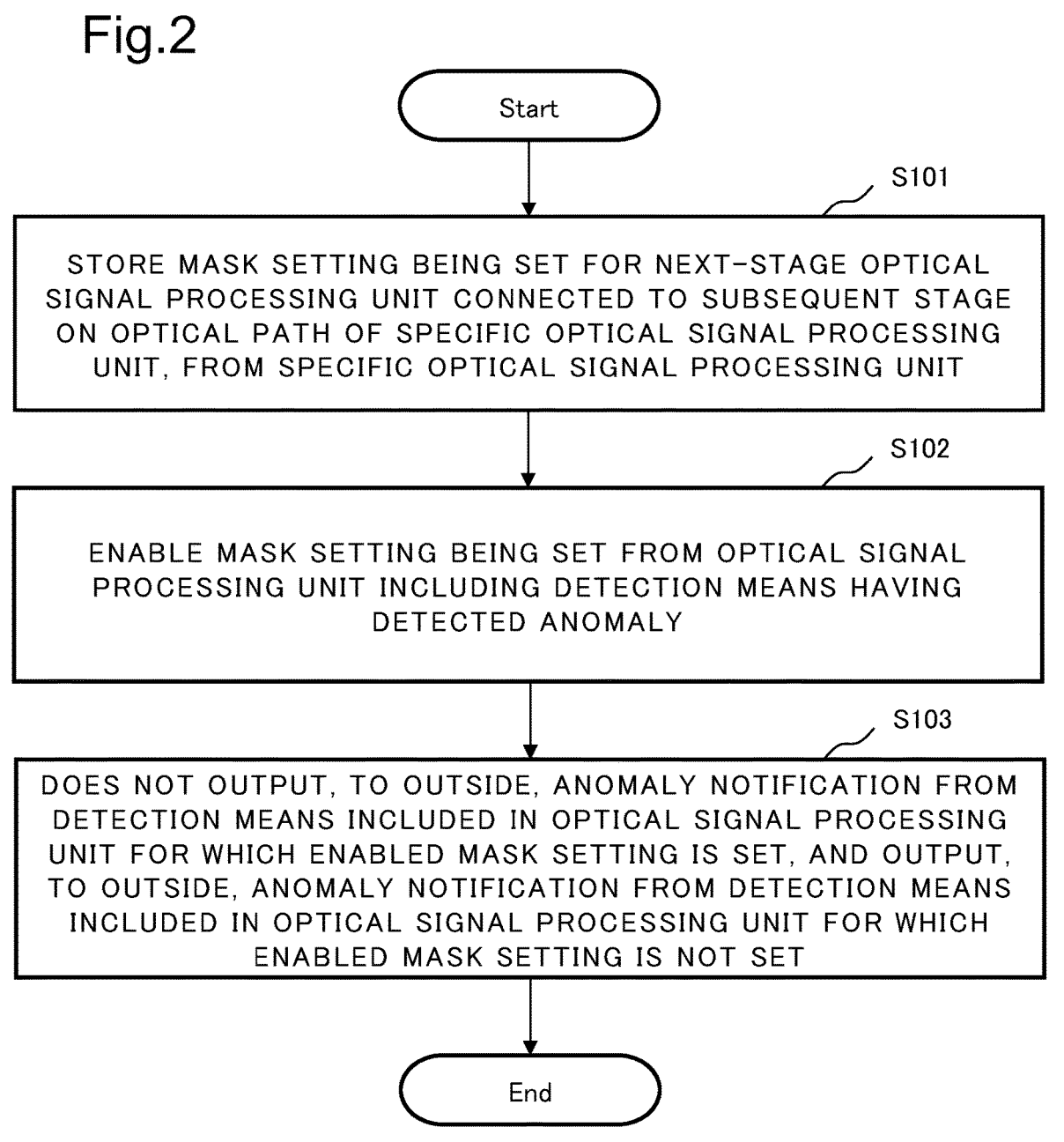

Start

S101

STORE MASK SETTING BEING SET FOR NEXT-STAGE OPTICAL SIGNAL PROCESSING UNIT CONNECTED TO SUBSEQUENT STAGE ON OPTICAL PATH OF SPECIFIC OPTICAL SIGNAL PROCESSING UNIT, FROM SPECIFIC OPTICAL SIGNAL PROCESSING UNIT

S102

ENABLE MASK SETTING BEING SET FROM OPTICAL SIGNAL PROCESSING UNIT INCLUDING DETECTION MEANS HAVING DETECTED ANOMALY

S103

DOES NOT OUTPUT, TO OUTSIDE, ANOMALY NOTIFICATION FROM DETECTION MEANS INCLUDED IN OPTICAL SIGNAL PROCESSING UNIT FOR WHICH ENABLED MASK SETTING IS SET, AND OUTPUT, TO OUTSIDE, ANOMALY NOTIFICATION FROM DETECTION MEANS INCLUDED IN OPTICAL SIGNAL PROCESSING UNIT FOR WHICH ENABLED MASK SETTING IS NOT SET

End

OPTICAL COMMUNICATION DEVICE 2
100
110
PROCESSING MEANS
130
120
DETECTION MEANS
OUTPUT MEANS
100
110
PROCESSING MEANS
40
130
120
RECEPTION MEANS
DETECTION MEANS
OUTPUT MEANS
100
110
PROCESSING MEANS
130
120
DETECTION MEANS
OUTPUT MEANS

Fig.6

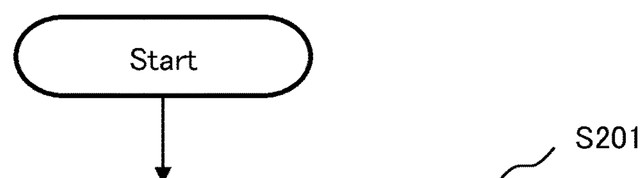

BASED ON MASK SETTING BEING SET FROM OPTICAL SIGNAL PROCESSING UNIT 100 INCLUDING DETECTION MEANS 130 HAVING DETECTED ANOMALY, DOES NOT OUTPUT, TO OUTSIDE, ANOMALY NOTIFICATION FROM DETECTION MEANS INCLUDED IN OPTICAL SIGNAL PROCESSING UNIT FOR WHICH MASK SETTING IS SET, AND OUTPUT, TO OUTSIDE, ANOMALY NOTIFICATION FROM DETECTION MEANS INCLUDED IN OPTICAL SIGNAL PROCESSING UNIT FOR WHICH MASK SETTING IS NOT SET

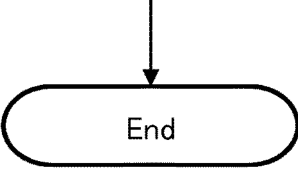

OPTICAL COMMUNICATION DEVICE AND CONTROL METHOD FOR OPTICAL COMMUNICATION DEVICE

This application is a National Stage Entry of PCT/JP2021/030520 filed on Aug. 20, 2021, the contents of all of which are incorporated herein by reference, in their entirety.

TECHNICAL FIELD

The present invention relates to an optical communication device that makes it possible to set a mask according to a combination of optical signal processing units in the optical communication device, and the like.

BACKGROUND ART

When a failure occurs in a communication device, "alarm masking" is performed for limiting issued alarms and masking an unnecessary alarm. For example, a technique related to alarm masking is disclosed in PTLs 1 and 2. Further, in a general communication device, an alarm mask setting is fixedly written in firmware of each communication device.

Meanwhile, in order to suppress increase in the number of types of hardware, a communication device is developed that consists of one type of hardware provided with a plurality of function blocks and is used by combining only function blocks required in a system.

CITATION LIST

Patent Literature

[PTL 1] Japanese Unexamined Patent Application Publication No. 2007-259316

[PTL 2] Japanese Unexamined Patent Application Publication No. H08-298533

SUMMARY OF INVENTION

Technical Problem

For example, an optical communication device that transmits and receives an optical signal is usually configured by combining optical signal processing units that process the optical signal. A function of such an optical communication device differs according to a combination of internal optical signal processing units, and a mask setting required in a system also differs according to a function. Therefore, when a mask setting is written in firmware, it is not possible to appropriately set a mask setting suitable for various functions achieved by the optical communication device.

The present invention is made in view of the above-described problem, and an object of the present invention is to provide an optical communication device and the like that make it possible to set a mask according to a combination of optical signal processing units in the optical communication device.

Solution to Problem

An optical communication device according to the present invention includes:

a plurality of optical signal processing units including a processing means for processing an input optical signal, an output means for outputting the optical signal processed by the processing means, and a detection means for detecting an anomaly in the optical signal in the output means; and a reception means for receiving a notification of the anomaly from the detection means in the plurality of optical signal processing units, and for outputting the notification to outside, in which the plurality of optical signal processing units are provided on one optical path, and, from a specific optical signal processing unit, among the plurality of optical signal processing units, that includes the detection means having detected the anomaly, based on a mask setting being set for a next-stage optical signal processing unit connected to a subsequent stage on the optical path of the specific optical signal processing unit, the reception means does not output, to outside, an anomaly notification from the detection means included in the optical signal processing unit for which the mask setting is set, and outputs, to outside, an anomaly notification from the detection means included in the optical signal processing unit for which the mask setting is not set.

A control method for an optical communication device according to the present invention is a control method for an optical communication device including:

a plurality of optical signal processing units including a processing means for processing an input optical signal, an output means for outputting the optical signal processed by the processing means, and a detection means for detecting an anomaly in the optical signal in the output means; and a reception means for receiving a notification of the anomaly from the detection means in the plurality of optical signal processing units, and for outputting the notification to outside; in which the plurality of optical signal processing units are provided on one optical path, and, from a specific optical signal processing unit, among the plurality of optical signal processing units, that includes the detection means having detected the anomaly, based on a mask setting being set for a next-stage optical signal processing unit connected to a subsequent stage on the optical path of the specific optical signal processing unit, the reception means does not output, to outside, an anomaly notification from the detection means included in the optical signal processing unit for which the mask setting is set, and outputs, to outside, an anomaly notification from the detection means included in the optical signal processing unit for which the mask setting is not set.

Advantageous Effects of Invention

According to the present invention, an optical communication device and the like that make it possible to set a mask according to a combination of optical signal processing units in the optical communication device can be provided.

BRIEF DESCRIPTION OF DRAWINGS

FIG. 2 is a flowchart illustrating an operation of the optical communication device according to the first example embodiment of the present invention.

FIG. 6 is a flowchart illustrating an operation of the optical communication device according to the second example embodiment of the present invention.

EXAMPLE EMBODIMENT

First Example Embodiment

Figure 1:
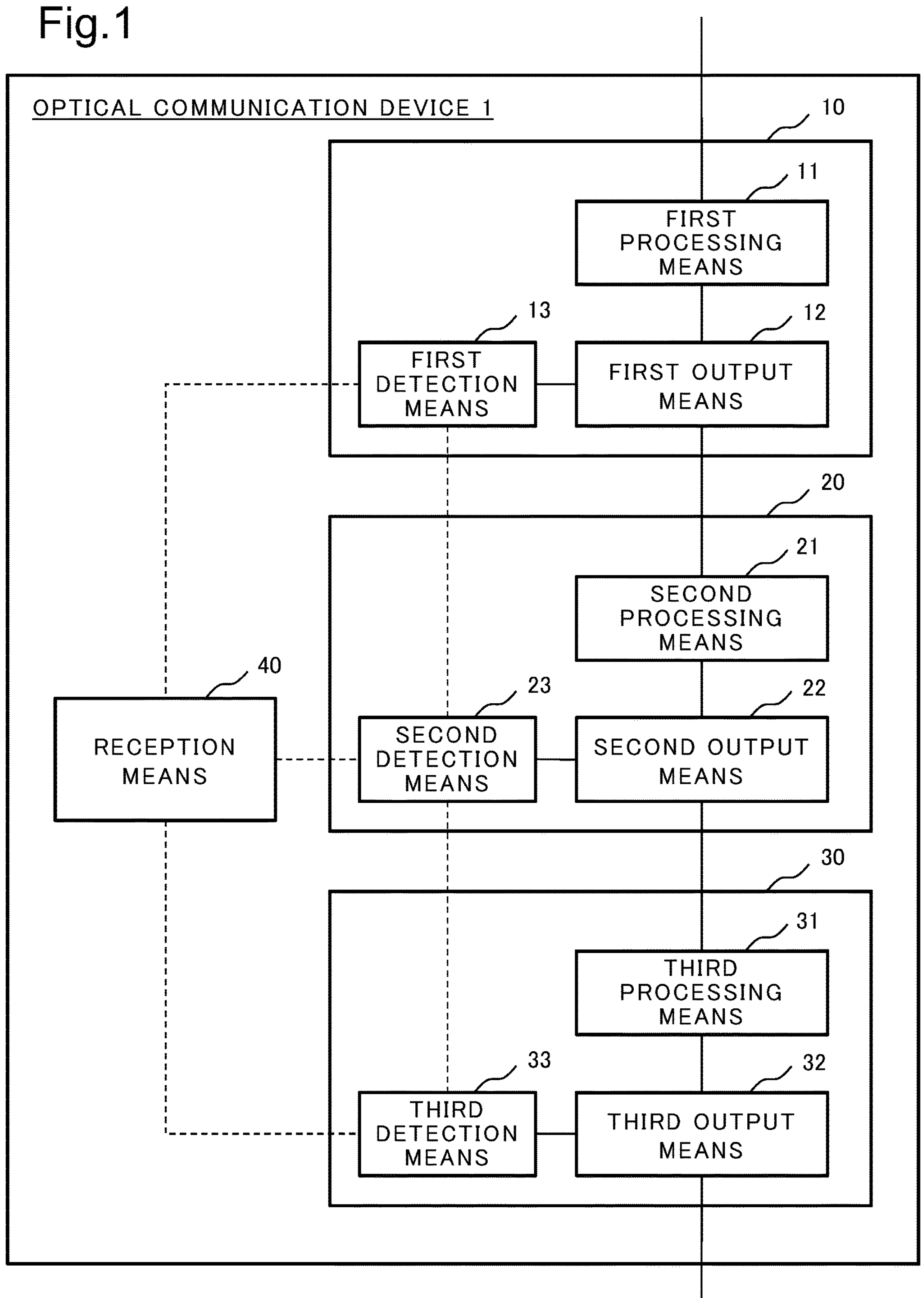
FIG. 1 is a block diagram illustrating a configuration example of an optical communication device according to a first example embodiment of the present invention.

An optical communication device 1 according to a first example embodiment is described with reference to FIGS. 1 and 2. FIG. 1 is a schematic diagram illustrating a configuration example of the optical communication device 1. As illustrated in FIG. 1, the optical communication device 1 includes a first optical signal processing unit 10, a second optical signal processing unit 20, a third optical signal processing unit 30, and a reception means 40. The optical communication device 1 receives input of an optical signal from an upper side in FIG. 1 and outputs the optical signal from a lower side in FIG. 1. The optical communication device 1 is an optical communication device that processes the input optical signal by using the first optical signal processing unit 10, the second optical signal processing unit 20, and the third optical signal processing unit 30. The processing herein refers to, for example, amplification of the optical signal.

The first optical signal processing unit 10 includes a first processing means 11, a first output means 12, and a first detection means 13. The first optical signal processing unit 10 is connected to the second optical signal processing unit 20. The first optical signal processing unit 10 receives input of an optical signal from the user side in FIG. 1 and outputs the optical signal to the second optical signal processing unit 20.

The first processing means 11 processes the optical signal. The first processing means 11 is, for example, an optical amplifier. The first output means 12 outputs the optical signal processed by the first processing means 11. The first output means 12 is, for example, an optical output port.

The first detection means 13 detects an anomaly in the optical signal at the first output means 12. For example, when intensity of the optical signal is equal to or less than a threshold value, the first detection means 13 detects an anomaly in the optical signal. Further, when the first processing means 11 is an optical amplifier that amplifies an optical signal in response to pumping light, the first detection means 13 may detect an anomaly in the optical signal when intensity of the pumping light is equal to or less than a threshold value. For example, the optical amplifier is an erbium doped fiber amplifier (EDFA). When an anomaly in the optical signal is detected, the first detection means 13 notifies the reception means 40 of the anomaly in the optical signal.

Further, the second optical signal processing unit 20 includes a second processing means 21, a second output means 22, and a second detection means 23. A second optical signal processing unit 20 is connected to the first optical signal processing unit 10 and the third optical signal processing unit 30. The second optical signal processing unit 20 receives input of the optical signal from the first optical signal processing unit 10, and outputs the optical signal to the third optical signal processing unit 30.

The second processing means 21 processes the optical signal. The second processing means 21 is, for example, an optical amplifier. The second output means 22 outputs the optical signal processed by the second processing means 21. The second output means 22 is, for example, an optical output port.

The second detection means 23 detects an anomaly in the optical signal at the second output means 22. For example, when intensity of the optical signal is equal to or less than a threshold value, the second detection means 23 detects an anomaly in the optical signal. Further, when the second processing means 21 is an optical amplifier that amplifies an optical signal in response to pumping light, the second detection means 23 may detect an anomaly in the optical signal when intensity of the pumping light is equal to or less than a threshold value. For example, the optical amplifier is an EDFA. When an anomaly in the optical signal is detected, the second detection means 23 notifies the reception means 40 of the anomaly in the optical signal.

Further, the third optical signal processing unit 30 includes a third processing means 31, a third output means 32, and a third detection means 33. The third optical signal processing unit 30 is connected to the second optical signal processing unit 20. The third optical signal processing unit 30 receives input of the optical signal from the second optical signal processing unit 20 and outputs the optical signal to an outside of the optical communication device 1 (the lower side in FIG. 1).

The third processing means 31 processes the optical signal. The third processing means 31 is, for example, an optical amplifier. The third output means 32 outputs the optical signal processed by the third processing means 31. The third output means 32 is, for example, an optical output port.

The third detection means 33 detects an anomaly in the optical signal at the second output means 22. For example, when intensity of the optical signal is equal to or less than a threshold value, the third detection means 33 detects an anomaly in the optical signal. Further, when the third processing means 31 is an optical amplifier that amplifies an optical signal in response to pumping light, the third detection means 33 may detect an anomaly in the optical signal when intensity of the pumping light is equal to or less than a threshold value. For example, the optical amplifier is an EDFA. When an anomaly in the optical signal is detected, the third detection means 33 notifies the reception means 40 of the anomaly in the optical signal.

The reception means 40 receives notification of the anomaly from the first detection means 13, the second detection means 23, and the third detection means 33 in the plurality of optical signal processing units (the first optical signal processing unit 10, the second optical signal processing unit 20, and the third optical signal processing unit 30).

Further, the reception means 40 stores a mask setting that is set, from a specific optical signal processing unit among the plurality of optical signal processing units 10, 20, and 30, for a next-stage optical signal processing unit connected to a subsequent stage on an optical path of the specific optical signal processing unit. Specifically, in the example illustrated in FIG. 1, the reception means 40 stores a mask setting for the second optical signal processing unit 20 from the first optical signal processing unit 10 and a mask setting for the third optical signal processing unit 30 from the second optical signal processing unit 20. These mask settings are input to the reception means 40 by a user of the optical communication device 1, and the like.

The reception means 40 enables a mask setting set from an optical signal processing unit that includes a detection means from which an anomaly is detected, among the plurality of detection means 13, 23, and 33. Specifically, when an anomaly is notified from the first detection means 13, the reception means 40 enables the mask setting for the second optical signal processing unit 20 from the first optical signal processing unit 10. Further, when an anomaly is notified from the second detection means 23, the reception means 40 enables the mask setting for the third optical signal processing unit 30 from the second optical signal processing unit 20.

The reception means 40 does not output, to the outside, an anomaly notification from a detection means included in an optical signal processing unit for which an enabled mask setting is set, and outputs, to the outside, an anomaly notification from a detection means included in an optical signal processing unit for which no enabled mask setting is set.

Specifically, when an anomaly is notified from all of the plurality of detection means 13, 23, and 33, the mask settings for the second optical signal processing unit 20 and the third optical signal processing unit 30 are enabled. Therefore, the reception means 40 in this case outputs, to the outside, an anomaly notification from the first detection means 13 included in the first optical signal processing unit 10 for which no enabled mask setting is set. Meanwhile, the reception means 40 does not output, to the outside, anomaly notifications from the second detection means 23 and the third detection means 33 included in the second optical signal processing unit 20 and the third optical signal processing unit 30 for which the enabled mask settings are set.

Further, when an anomaly is notified from the second detection means 23 and the third detection means 33, the mask setting for the third optical signal processing unit 30 is enabled. Therefore, the reception means 40 in this case outputs, to the outside, an anomaly notification from the second detection means 23 included in the second optical signal processing unit 20 for which no enabled mask setting is set. Meanwhile, the reception means 40 does not output, to the outside, an anomaly notification from the third detection means 33 included in the third optical signal processing unit 30 for which the enabled mask setting is set.

Note that, the reception means 40 indicates to the outside of the optical communication device 1 that an anomaly occurs at each of the optical signal processing units by a call from a speaker, an indication on a display, or a notification to another communication device.

Next, an operation of the optical communication device 1 is described with reference to FIG. 2. FIG. 2 is a flowchart illustrating an operational example of the optical communication device 1.

The reception means 40 stores a mask setting that is set, from a specific optical signal processing unit, for a next-stage optical signal processing unit connected to a subsequent stage on an optical path of a specific optical signal processing unit (S101). Specifically, in the optical communication device 1 illustrated in FIG. 1, the reception means 40 stores a mask setting for the second optical signal processing unit 20 from the first optical signal processing unit 10 and a mask setting for the third optical signal processing unit 30 from the second optical signal processing unit 20. These mask settings are input to the reception means 40 by a user of the optical communication device 1, and the like.

The reception means 40 enables a mask setting set from an optical signal processing unit that includes a detection means from which an anomaly is detected (S102). Specifically, when an anomaly is notified from the first detection means 13, the reception means 40 enables the mask setting for the second optical signal processing unit 20 from the first optical signal processing unit 10. Further, when an anomaly is notified from the second detection means 23, the reception means 40 enables the mask setting for the third optical signal processing unit 30 from the second optical signal processing unit 20.

The reception means 40 does not output, to the outside, an anomaly notification from a detection means included in an optical signal processing unit for which an enabled mask setting is set, and outputs, to the outside, an anomaly notification from a detection means included in an optical signal processing unit for which no enabled mask setting is set (S103). Specifically, when an anomaly is notified from all of the plurality of detection means 13, 23, and 33, mask settings for the second optical signal processing unit 20 and the third optical signal processing unit 30 are enabled. Therefore, the reception means 40 in this case outputs, to the outside, an anomaly notification from the first detection means 13 included in the first optical signal processing unit 10 for which no enabled mask setting is set. Meanwhile, the reception means 40 does not output, to the outside, an anomaly notification from the second detection means 23 and the third detection means 33 included in the second optical signal processing unit 20 and the third optical signal processing unit 30 for which the enabled mask settings are set.

It is assumed that the optical communication device 1 further includes at least one additional optical signal processing unit configured in similar way as each of the first optical signal processing unit 10, the second optical signal processing unit 20, and the third optical signal processing unit 30, at a subsequent stage of the third optical signal processing unit 30. In this case, the reception means 40 stores a mask setting for the additional optical signal processing unit from the third optical signal processing unit 30.

Even when an anomaly in an optical signal is detected at all of the first detection means 13, the second detection means 23, and the third detection means 33, the enabled mask settings are set for the second optical signal processing unit 20 and the third optical signal processing unit 30. Therefore, an anomaly notified to the reception means 40 from the second detection means 23 and the third detection means 33 is not output to the outside. Thereby, according to the optical communication device 1, only an anomaly notification from the first detection means 13 at a frontmost stage of the plurality of optical signal processing units at which an anomaly in an optical signal has occurred (the first optical signal processing unit 10, the second optical signal processing unit 20, and the third optical signal processing unit 30) is output to the reception means 40.

Note that, in the above-described example, an operation in a case in which an anomaly occurs in all optical signals at the first output means 12, the second output means 22, and the third output means 32 is described. Meanwhile, when no anomaly occurs in the optical signal at the first output means 12 and an anomaly occurs in the optical signals at the second output means 22 and the third output means 32, only an anomaly notification from the second detection means 23 at a frontmost stage of the plurality of optical signal processing units at which the anomaly in the optical signals has occurred (the second optical signal processing unit 20 and the third optical signal processing unit 30) is output to the outside from the reception means 40.

Figure 3:
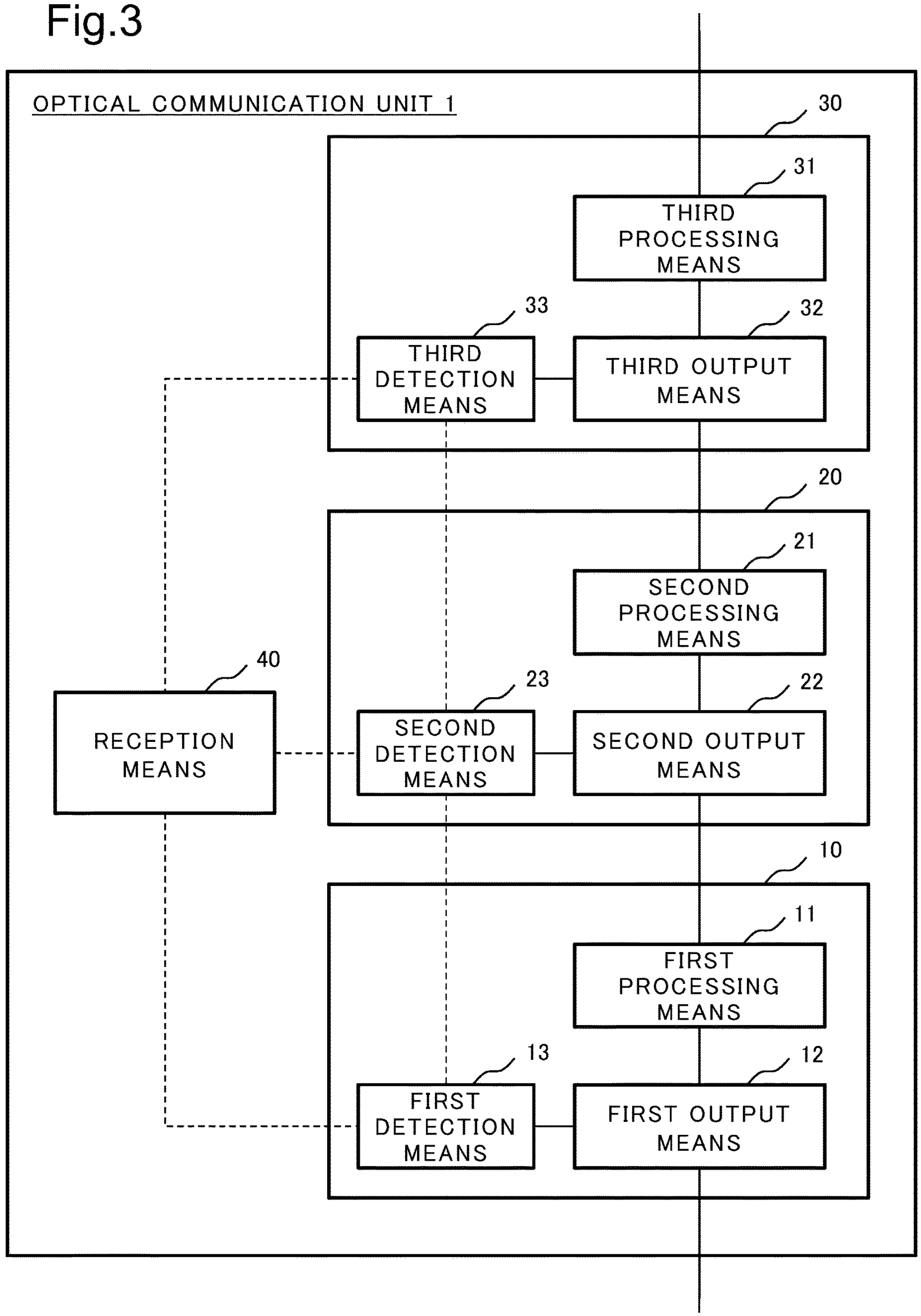
FIG. 3 is a block diagram illustrating a configuration example of the optical communication device according to the first example embodiment of the present invention.

Further, the optical communication device 1 is configured as illustrated in FIG. 3 by a user of the optical communication device 1 by switching a connection relationship between the first optical signal processing unit 10, the second optical signal processing unit 20, and the third optical signal processing unit 30. Specifically, in the optical communication device 1 illustrated in FIG. 3, the third optical signal processing unit 30 outputs an optical signal to the second optical signal processing unit 20. Further, the second optical signal processing unit 20 output the optical signal to the first optical signal processing unit 10.

An operation of the optical communication device 1 illustrated in FIG. 3 is described with reference to FIG. 2.

The reception means 40 stores a mask setting that is set, from a specific optical signal processing unit, for a next-stage optical signal processing unit connected to a subsequent stage on an optical path of the specific optical signal processing unit (S101). Specifically, in the optical communication device 1 illustrated in FIG. 3, the reception means 40 stores a mask setting for the second optical signal processing unit 20 from the third optical signal processing unit 30 and a mask setting for the first optical signal processing unit 10 from the second optical signal processing unit 20. These mask settings are input to the reception means 40 by a user of the optical communication device 1, and the like.

The reception means 40 enables a mask setting set from an optical signal processing unit that includes a detection means that has notified an anomaly (S102). Specifically, when an anomaly is notified from the third detection means 33, the reception means 40 enables the mask setting for the second optical signal processing unit 20 from the third optical signal processing unit 30. Further, when an anomaly is notified from the second detection means 23, the reception means 40 enables the mask setting for the first optical signal processing unit 10 from the second optical signal processing unit 20.

The reception means 40 does not output, to the outside, an anomaly notification from a detection means included in an optical signal processing unit for which an enabled mask setting is set, and outputs, to the outside, an anomaly notification from a detection means included in an optical signal processing unit for which no enabled mask setting is set (S103). Specifically, when an anomaly is notified from all of the plurality of detection means 13, 23, and 33, the mask settings for the second optical signal processing unit 20 and the first optical signal processing unit 10 are enabled. Therefore, the reception means 40 in this case outputs, to the outside, an anomaly notification from the third detection means 33 included in the third optical signal processing unit 30 for which no enabled mask setting is set. Meanwhile, the reception means 40 does not output an anomaly notification from the second detection means 23 and the first detection means 13 included in the second optical signal processing unit 20 and the first optical signal processing unit 10 for which the enabled mask settings are set.

As described above, the optical communication device 1 includes a plurality of optical signal processing units including a processing means for processing an input optical signal, an output means for outputting the optical signal processed by the processing means, and a detection means for detecting an anomaly in the optical signal at the output means. Note that, the processing means refers to any one of the first processing means 11, the second processing means 21, and the third processing means 31. Further, the output means refers to any one of the first output means 12, the second output means 22, and the third output means 32. Further, the detection means refers to any one of the first detection means 13, the second detection means 23, and the third detection means 33. The optical signal processing unit refers to any one of the first optical signal processing unit 10, the second optical signal processing unit 20, and the third optical signal processing unit 30. Furthermore, the reception means 40 receives, from the detection means in the plurality of optical signal processing units, a notification of an anomaly in an optical signal. Further, the plurality of optical signal processing units are provided on one optical path.

On the basis of a mask setting that is set, from a specific optical signal processing unit, among the plurality of optical signal processing units, that includes a detection means that has detected an anomaly, for a next-stage optical signal processing unit connected to a subsequent stage on an optical path of the specific optical signal processing unit, the reception means 40 does not output, to the outside, an anomaly notification from a detection means included in the optical signal processing unit for which the mask setting is set, and outputs, to the outside, an anomaly notification from the detection unit included in the optical signal processing unit for which the mask setting is not set.

As described above, a mask setting is set for a next-stage optical signal processing unit connected to a subsequent stage of a specific optical signal processing unit, among a plurality of optical signal processing units, that includes a detection means that has detected an anomaly. The reception means 40 does not output, to the outside, an anomaly notification from a detection means included in the optical signal processing unit for which the mask setting is set, and outputs, to the outside, an anomaly notification from the detection means included in the optical signal processing unit for which the mask setting is not set. Therefore, even when a connection relationship between the optical signal processing units of the optical communication device 1 is switched from as illustrated in FIGS. 1 to 3, the reception means 40 outputs, to the outside, only a notification from a detection means included in an optical signal processing unit at a frontmost stage of a plurality of optical signal processing units including the detection means that has notified an anomaly. Specifically, according to the optical communication device 1, a mask can be set according to a combination of the optical signal processing units in the optical communication device 1.

Figure 4:
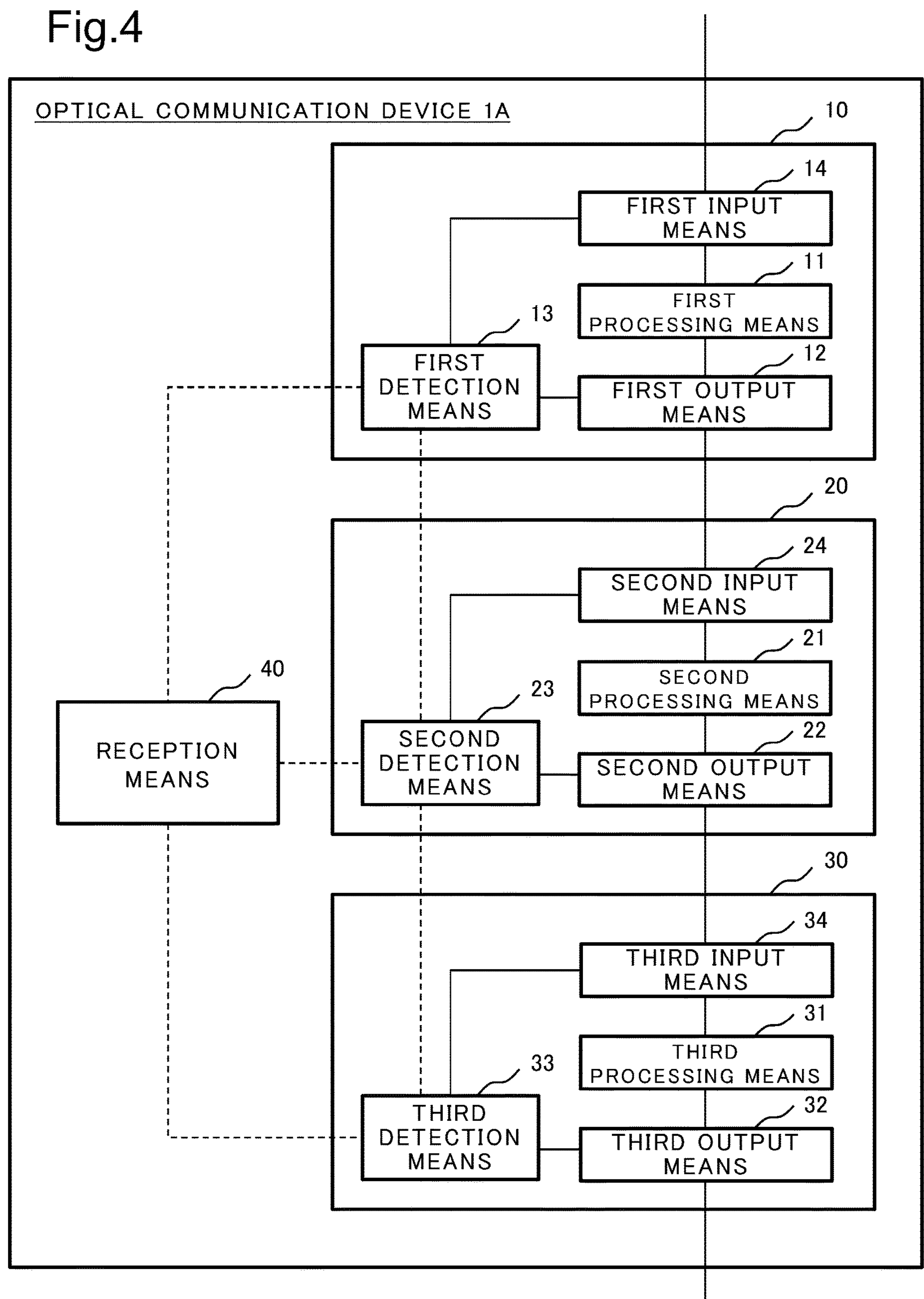
FIG. 4 is a block diagram illustrating a modification example of the optical communication device according to the first example embodiment of the present invention.

Next, an optical communication device 1A is described. FIG. 4 is a block diagram illustrating a configuration example of the optical communication device 1A. The optical communication device 1A is a modification example of the optical communication device 1.

The optical communication device 1A includes a first input means 14, a second input means 24, and a third input means 34, in addition to the components included in the optical communication device 1. Each of the first input means 14, the second input means 24, and the third input means 34 is, for example, an input port for an optical signal.

The first input means 14 is provided in the first optical signal processing unit 10. When detecting an anomaly in an optical signal at the first input means 14, the first detection means 13 notifies the reception means 40 of the anomaly in the optical signal. Further, the second input means 24 is provided in the second optical signal processing unit 20. When detecting an anomaly in an optical signal at the second input means 24, the second detection means 23 notifies the reception means 40 of the anomaly in the optical signal. Further, the third input means 34 is provided in the third optical signal processing unit 30. When detecting an anomaly in an optical signal at the third input means 34, the third detection means 33 notifies the reception means 40 of the anomaly in the optical signal.

The reception means 40 receives, from each of the detection means, a notification of an anomaly in an optical signal at the first input means 14, the second input means 24, and the third input means 34, and outputs the notification to the outside. At this occasion, when receiving a notification of an anomaly in an optical signal at the first input means 14 from the first detection means 13, the reception means 40 outputs, to the outside, the notification of the anomaly in the optical signal at the first input means 14, and does not output, to the outside, an anomaly in an optical signal at the first output means 12.

Further, for example, when receiving a notification of an anomaly in an optical signal at the second input means 24 from the second detection means 23, the reception means 40 outputs, to the outside, the notification of the anomaly in the optical signal at the second input means 24, and does not output, to the outside, an anomaly in an optical signal at the second output means 22.

Further, for example, when receiving a notification of an anomaly in an optical signal at the third input means 34 from the third detection means 33, the reception means 40 outputs, to the outside, the notification of the anomaly in the optical signal at the third input means 34, and does not output, to the outside, an anomaly in an optical signal at the third output means 32.

Note that, in the above-described examples, one detection means (for example, the first detection means 13) detects both an anomaly in an optical signal at an input means (for example, the first input means 14) and an anomaly in an optical signal at an output means (for example, the first output means 12), however, each of the anomalies may be detected by a separate detection means.

Further, in the configuration example of the optical communication device 1A illustrated in FIG. 4, the first optical signal processing unit 10, the second optical signal processing unit 20, and the third optical signal processing unit 30 are connected in this order along an optical signal flow. Alternatively, in the optical communication device 1A, the third optical signal processing unit 30, the second optical signal processing unit 20, and the first optical signal processing unit 10 may be connected in this order along an optical signal flow, as illustrated in FIG. 3.

When the connection relationship between the plurality of optical signal processing units is switched as in the above-described example, the mask setting between the plurality of detection means (the first detection means 13, the second detection means 23, and the third detection means 33) is also switched. Meanwhile, a previous-next relationship of the input means and the output means (first input means 14 and the first output means 12, the second input means 24 and the second output means 22, the third input means 34 and the third output means 32) on an optical signal path is not switched. Therefore, when an anomaly in an optical signal at the input means is detected, a notification of anomaly at an optical output means stored in the same optical signal processing unit as the input means is not output from the reception means 40 to the outside.

Second Example Embodiment

Figure 5:
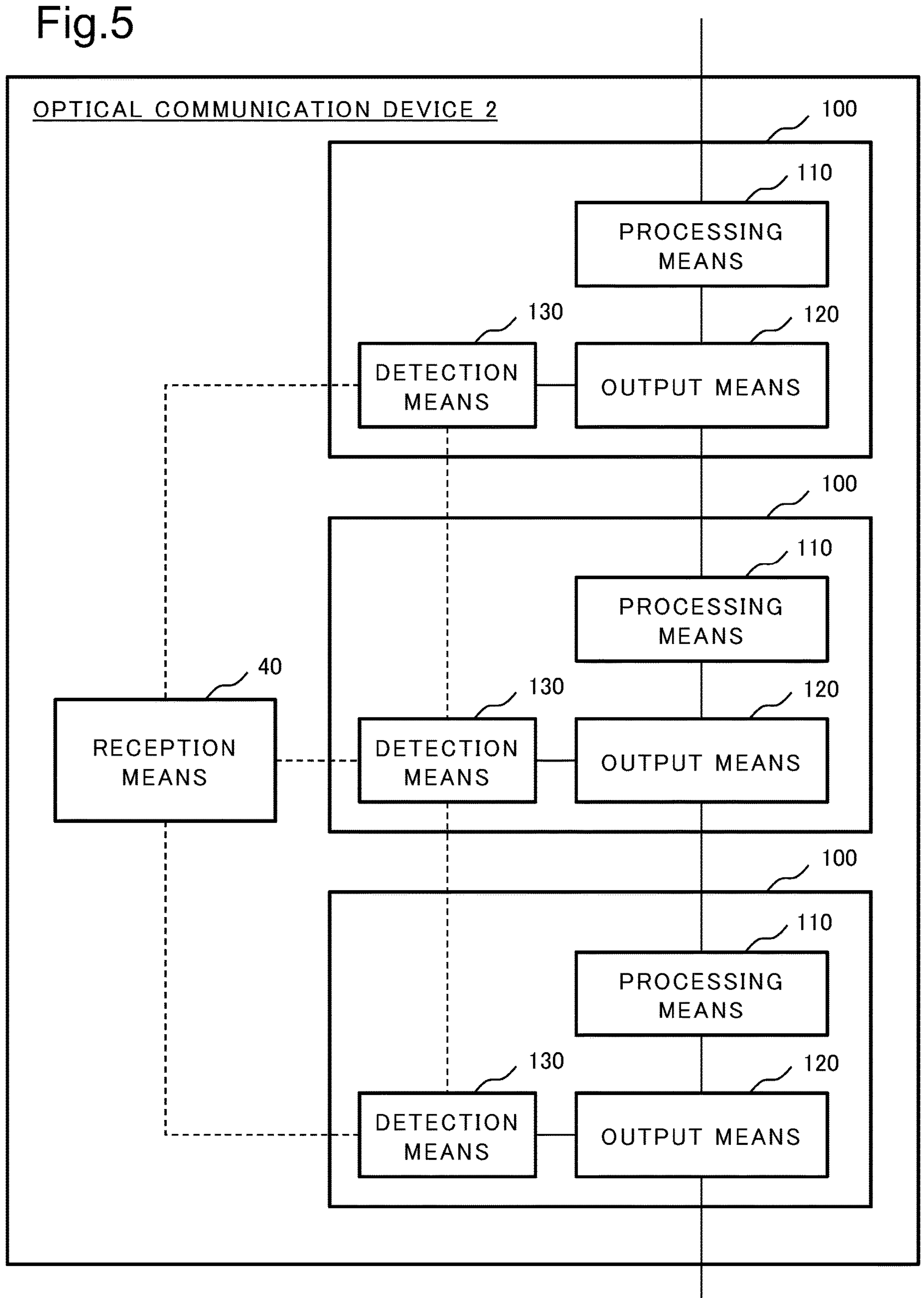
FIG. 5 is a block diagram illustrating a configuration example of an optical communication device according to a second example embodiment of the present invention.

An optical communication device 2 according to a second example embodiment is described with reference to FIG. 5. The optical communication device 2 includes a plurality of optical signal processing units 100 and a reception means 140. The plurality of optical signal processing units 100 is provided on one optical path. The optical signal processing unit 100 includes a processing means 110, an output means 120, and a detection means 130. The processing means 110 processes an input optical signal. The output means 120 outputs the optical signal processed by the processing means 110. The detection means 130 detects an anomaly in the optical signal at the output means 120. When an anomaly in the optical signal is detected, the detection means 130 notifies the reception means 140 of the anomaly in the optical signal. The reception means 140 receives, from the detection means 130 in the plurality of optical signal processing units 100, a notification of an anomaly in the optical signal, and outputs the notification to an outside.

The reception means 140 stores a mask setting that is set, from a specific optical signal processing unit 100 among the plurality of optical signal processing units 100, for a next-stage optical signal processing unit 100 connected to a subsequent stage on an optical path of the specific optical signal processing unit 100. On the basis of a mask setting that is set from the optical signal processing unit 100 that includes the detection means 130 that has detected an anomaly, a reception means 40 does not output, to the outside, an anomaly notification from the detection means 130 included in the optical signal processing unit 100 for which the mask setting is set, and outputs, to the outside, an anomaly notification from the detection means 130 included in the optical signal processing unit 100 for which the mask setting is not set.

Next, an operation of the optical communication device 2 is described with reference to FIG. 7, FIG. 7 is a flowchart illustrating an operational example of the optical communication device 2.

On the basis of a mask setting that is set from the optical signal processing unit 100 that includes the detection means 130 that has detected an anomaly, the reception means 140 does not output, to the outside, an anomaly notification from a detection means that is included in an optical signal processing unit for which the mask setting is set, and outputs, to the outside, an anomaly notification from the detection means included in the optical signal processing unit for which the mask setting is not set (S201).

As described above, the mask setting is set for the next-stage optical signal processing unit 100, among the plurality of optical signal processing units 100, that is connected to the subsequent stage of the specific optical signal processing unit 100 that includes the detection means 130 that has detected an anomaly. The reception means 140 does not output an anomaly notification from the detection means 130 included in the optical signal processing unit 100 for which the mask setting is set, and outputs an anomaly notification from the detection means 130 included in the optical signal processing unit 100 for which the mask setting is not set. Therefore, even when a connection relationship between the optical signal processing units 100 in the optical communication device 2 is switched, the reception means 140 outputs only a notification from the detection means 130 included in a frontmost optical signal processing unit 100 among the plurality of optical signal processing units 100 that include the detection means 130 that have notified an anomaly. Specifically, according to the optical communication device 2, a mask can be set according to a combination of the optical signal processing units in the optical communication device 2.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. An optical communication device comprising:

three or more optical signal processors each including a processor configured to process an input optical signal, an output circuit configured to output the optical signal processed by the processor, and a detector configured to detect an anomaly in the optical signal in the output circuit; and a receiver configured to receive a notification of the anomaly from each detector in the optical signal processors and to output the notification to outside, wherein the optical signal processors are provided on one optical path, the receiver receives a mask setting that indicates whether a mask is enabled, the mask setting received from one or more of the optical signal processors at which the anomaly is detected for a next-stage optical signal processor connected to a subsequent stage on the optical path of the specific optical signal processor, and based on the mask setting, the receiver does not output, to outside, an anomaly notification from the detector included in the optical signal processor for which the mask is enabled, and outputs, to outside, an anomaly notification from the detector included in the optical signal processor for which the mask is not enabled.

2. The optical communication device according to claim 1, wherein the optical signal processors include a first optical signal processor, a second optical signal processor connected to a subsequent stage of the first optical signal processor, and a third optical signal processor connected to a subsequent stage of the second optical signal processor, and, when each detector in the first optical signal processor, the second optical signal processor, and the third optical signal processor detects an anomaly, based on a mask setting for the second optical signal processor from the first optical signal processor and a mask setting for the third optical signal processor from the second optical signal processor, the receiver does not output, to outside, an anomaly notification from each detectors included in the second optical signal processor and the third optical signal processor for which the mask setting is set, and outputs, to outside, an anomaly notification from the detector included in the first optical signal processor for which the mask setting is not set.

3. The optical communication device according to claim 2, wherein a connection relationship among the first optical signal processor, the second optical signal processor, and the third optical signal processor is switched, the optical signal processors include the third optical signal processor, the second optical signal processor connected to a subsequent stage of the third optical signal processor, and the first optical signal processor connected to a subsequent stage of the second optical signal processor, and, when each detector in the first optical signal processor, the second optical signal processor, and the third optical signal processor detects an anomaly, based on a mask setting for the second optical signal processor from the third optical signal processor and a mask setting for the first optical signal processor from the second optical signal processor, the receiver does not output, to outside, an anomaly notification from each detector included in the second optical signal processor and the first optical signal processor for which the mask setting is set, and outputs, to outside, an anomaly notification from the detector included in the third optical signal processor for which the mask setting is not set.

4. The optical communication device according to claim 1, wherein each detector detects the anomaly when intensity of the optical signal is equal to or less than a threshold value.

5. The optical communication device according to claim 1, wherein the processor is an optical amplifier configured to amplify the optical signal according to pumping light, and the detector detects the anomaly when intensity of the pumping light is equal to or less than a threshold value.

6. The optical communication device according to claim 1, wherein the optical signal processor further includes an input circuit configured to receive the optical signal, and the detector further detects an anomaly in the optical signal in the input circuit.

7. A control method for an optical communication device including:

three or more optical signal processors including a processor configured to process an input optical signal, an output circuit configured to output the optical signal processed by the processor, and a detector configured to detect an anomaly in the optical signal in the output circuit; and a receiver configured to receive a notification of the anomaly from each detector in the optical signal processors, and to output the notification to outside, the optical signal processors being provided on one optical path, receiving, by the receiver, a mask setting that indicates whether a mask is enabled, the mask setting received from one or more of the optical signal processors at which the anomaly is detected for a next-stage optical signal processor connected to a subsequent stage on the optical path of the specific optical signal processor, and based on whether the mask is enabled, by the receiver, not outputting, to outside, an anomaly notification from the detector included in the optical signal processor for which the mask is enabled, and outputting, to outside, an anomaly notification from the detector included in the optical signal processor for which the mask is not enabled.

* * * * *